United States Patent [19]

Marks et al.

[11] 4,178,090

[45] Dec. 11, 1979

[54] 3-DIMENSIONAL CAMERA DEVICE

[76] Inventors: Alvin M. Marks, 166-35 9th Ave., Whitestone; Mortimer Marks, 166-25 Cryders La., Beechhurst, both of N.Y. 11357

[21] Appl. No.: 811,543

[22] Filed: Jun. 30, 1977

Related U.S. Application Data

[63] Continuation-in-part of Ser. No. 516,676, Oct. 21, 1974, Pat. No. 3,990,087.

[51] Int. Cl.² ............................................. G03B 35/08
[52] U.S. Cl. ........................................ 354/117; 352/60
[58] Field of Search ................... 354/110, 115, 117; 352/57, 58, 60, 86, 43; 350/132, 133, 145, 147, 159, 130

[56] References Cited

U.S. PATENT DOCUMENTS

| | | | |
|---|---|---|---|
| 1,454,218 | 5/1923 | Folmer | 354/110 |
| 2,329,294 | 9/1943 | Ramsdell | 354/117 |
| 2,693,128 | 11/1954 | Dewhurst | 354/117 |
| 2,991,690 | 7/1961 | Grey et al. | 354/115 |
| 3,363,966 | 1/1968 | Hoch | 354/115 |
| 3,815,970 | 6/1974 | Murphy | 354/117 |
| 3,990,087 | 11/1976 | Marks | 354/117 |
| 4,009,951 | 3/1977 | Ihms | 354/117 |

*Primary Examiner*—Russell E. Adams

[57] ABSTRACT

This invention relates to a reflex camera device having a single lens for the photography of right and left images from an object space transmitted as first and second light ray bundles from two positions separated by an interocular distance onto a single frame of a single film strip; a first exterior means for distinguishing from each other the first and second light ray bundles; a single frame aperture; a second means near the image plane to separate the first and second light ray bundles from each position respectively into right and left adjacent images onto the single frame; means to control convergence, focus and interocular distance; and a reflex viewer containing a third distinguishing means near the image plane to enable the simultaneous viewing and photographing of right and left adjacent images; and optionally an indicium marking means for said film strip at the side of the frame line.

28 Claims, 14 Drawing Figures

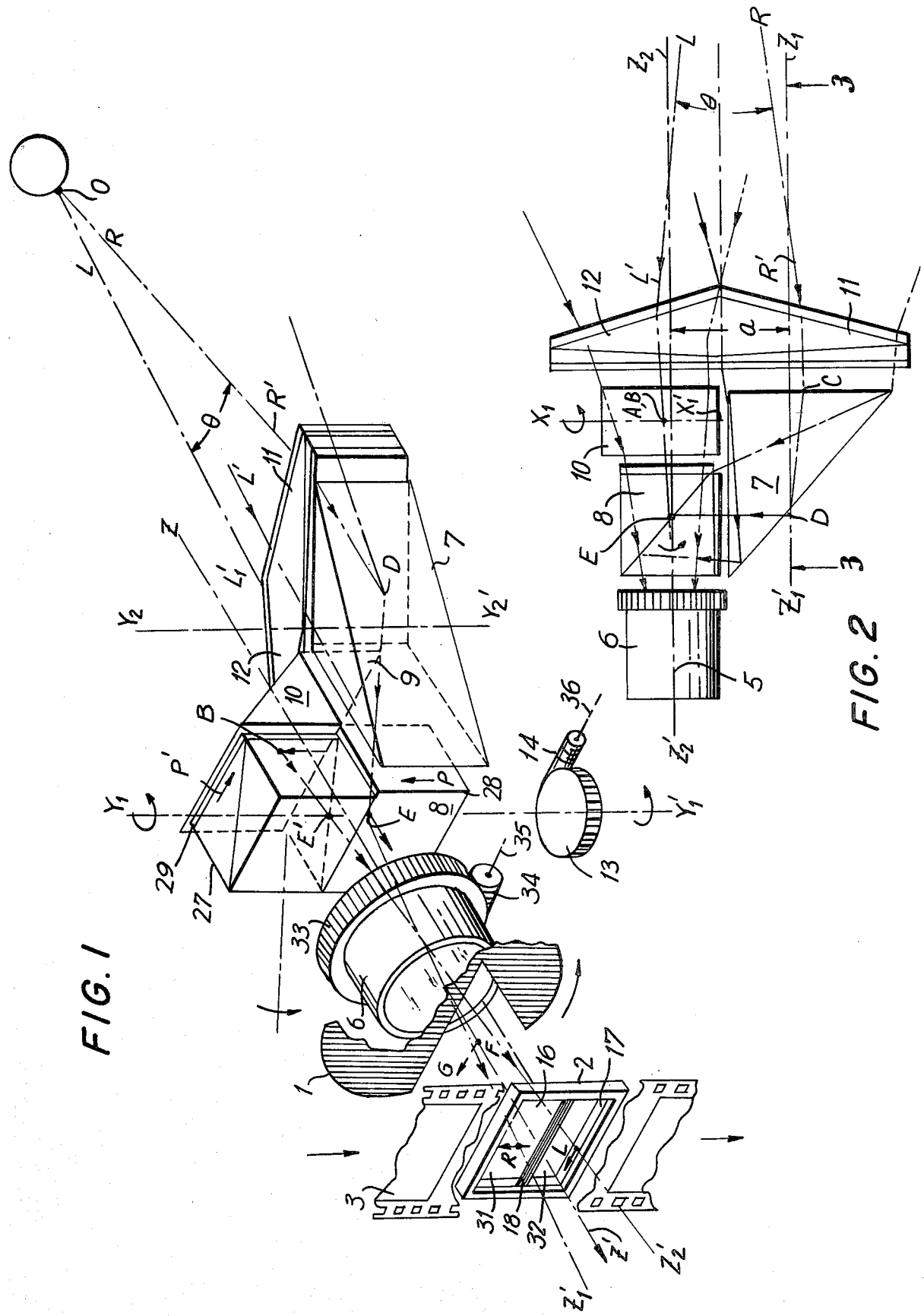

OBJECT DISTANCE
CONTROL DIAL

TRACKING
SPEED
CONTROL
DIAL

3-DIMENSIONAL CAMERA DEVICE

The present application is a continuation-in-part of Ser. No. 516,676 filed Oct. 21, 1974, now U.S. Pat. No. 3,990,087, and relates to certain new embodiments and improvements of the said inventions.

This invention relates to a reflex camera device for 3-dimensional photography. With this device, right and left light ray bundles from the object space being photographed carry the right and left images, respectively, to two positions, separated by an interocular distance, and these images are placed on adjacent areas of a frame of a film strip. Means are provided to control convergence, focus and interocular distance. A reflex viewfinder enables the simultaneous viewing and photographing of the right and left images, and means are provided to photograph an indicium marking on the film to indicate true stereo.

BACKGROUND OF THE DISCLOSURE

The prior art shows many devices for photographing images from two positions separated by an interocular distance to form right and left adjacent images onto a frame of a film strip, one above the other or side by side; or two cameras for photographing right and left images from two positions separated by an interocular distance onto two film strips; subsequently the corresponding right and left images on frames from these two film strips were combined by uniform or anamorphic reduction to form right and left adjacent images side by side or one over the other on a single frame of a single film strip. In the former, mechanical devices such as rotating mirrors or shutters with reflecting or prism beam splitters, or a double lens system was used. These former devices were complex, lacked control of essential variables, or were limited in angular aperture. In the latter, the process of combining two film strips onto a single film strip was costly because of the use of two film strips, and the precision registration and reduction techniques required. These difficulties inhibited the production of 3-D motion pictures.

The present invention overcomes the difficulties of the prior art by a device which uses a conventional single strip motion picture camera with a single lens, and which provides a wide angle aperture, adjustable convergence and focal length. The device of the present invention contains no mechanical moving parts such as shutter mechanisms or revolving mirrors. The device comprises relatively simple and inexpensive optical elements in a compact unit attached to a standard monocular camera, preferably of the reflex type, to enable the scene to be photographed while simultaneously presenting the right and left adjacent images to the cameraman, so that the convergence and focal length may be adjusted as required.

It is an object of this invention to provide a simple inexpensive optical device to adapt a monocular motion picture camera for the photography of 3-dimensional motion pictures.

It is an object of this invention to employ a single lens with mutually extinguishing pairs of filters before and after the lens to image right and left adjacent images on a single frame of the film at the gate, and at a reflex viewfinder.

It is an object of this invention to provide an optical device for adapting a monocular motion picture camera for the photography of 3-dimensional motion pictures in which the convergence, focus, and interocular distance is controlled simultaneously or independently while the scene being photographed is viewed by the cameraman through a reflex viewfinder.

It is an object of this invention to provide a compact optical device which has no moving mechanical parts other than the angular or distance adjustments of its optical elements for photographing right and left adjacent images onto a single frame of a single strip film.

An object of the present invention is to provide an optical device to adapt a monocular camera to 3-dimensional motion pictures in which the light loss is less than 1 stop.

It is an object of this invention to employ a monocular lens camera with an exterior mask and a dark bar at the center of the gate to define and separate the light and left images on a single frame of the film at the gate, and at a reflex viewfinder.

Another object of the present invention is to provide a variable interocular distance between the 3-dimensional viewing positions.

Still another object of the present invention is to provide a true stereo indicium marking on the film.

It is also an object of this invention to provide a binocular viewer or viewfinder to fuse adjacent stereo image pairs into a 3-D image in a viewing device.

Other objects and various further features of novelty and invention will be pointed out or will occur to those skilled in the art from a reading of the following specification in conjunction with the accompanying drawings. These drawings show, for illustrative purposes only, preferred forms and techniques of the invention:

DESCRIPTION OF THE DRAWINGS

FIG. 1 shows diagrammatically an isometric exploded view of the 3-dimensional camera device according to this invention.

FIG. 2 is a plan view section through an optical device according to this invention.

Referring now to FIG. 1, there is shown an isometric exploded view of the 3-dimensional camera device according to this invention. In this Figure, the optical elements, principal rays and major adjustments are diagrammatically shown. Only the necessary conventional camera elements are shown in this view. The camera employed may be of the reflex type, such as the Arriflex 35 mm camera which is often employed in professional motion picture photography. This camera has a revolving 45° conical shutter element 1, the front solid surfaces of which are reflecting. The stereo image rays are deflected at F in the direction FG normal to the Z Z' axis toward the viewing device. The image photographed at the gate plane 2 onto the film strip 3 is also projected identically into the viewfinder 4. The shutter 1 occludes the film gate 2 while the film strip 3 is being drawn down to the next frame by a mechanism not shown. Light from the scene being photographed proceeds along horizontal axes L L' and R R', which are in the same plane and converge to a point O in space at a distance p, as shown in FIG. 5. The angle between axes L L' and R R' is $\theta$. The right and left adjacent image pairs are seen fused in the viewfinder 4, shown in FIG. 7, exactly as they will appear when projected on a screen in 3-D.

Figure 3:
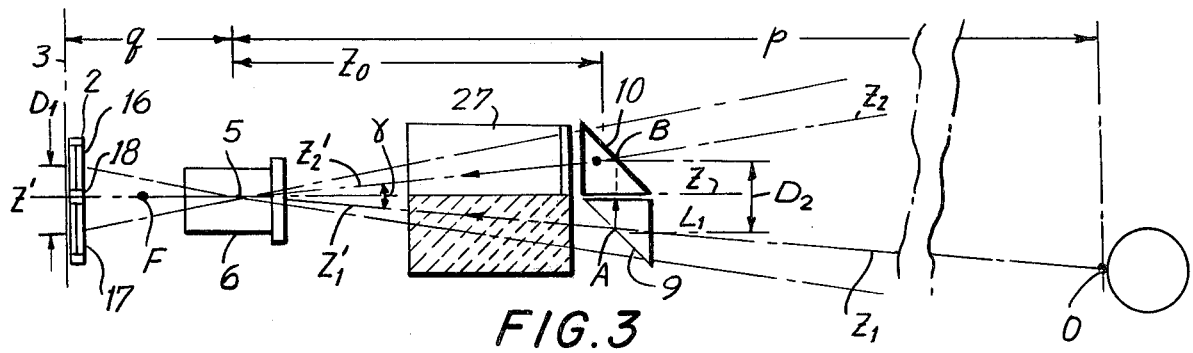
FIG. 3 is a diagrammatic side view vertical section through the optical elements of the present invention.

By a deflector is meant an optical element which changes the direction of a ray by a mirror, total internal reflecting prism, or a half-silvered reflecting plane or prism. By vertical is meant the Y axis; by horizontal, the X axis; the Z axis is the optical axis Z Z' of the camera lens 6. Axes X, Y, and Z are normal to each other. $Z_1 Z_1'$ is the first optical axis of the upper or first image in the gate which passes through its optical center and the optical center 5 of the lens 6. $Z_2 Z_2'$ is the second optical axis of the lower or second image in the gate which passes through its optical center and the optical center 5 of the lens 6. A solid glass element rather than a mirror and air path is used to decrease the angular divergence of the ray bundles, enabling a closer packing of the elements, enabling a standard interocular distance a of about 67 mm to be maintained.

By a polarizing axis is meant that direction of the filter parallel to the transmitted magnetic vector of light, which in known crystalline polymeric polarizers is parallel to the stretch axis of the polarizing material.

By a compound prism is meant a prism whose vertical and horizontal sections have different angles.

In FIG. 1, there is shown for horizontally deflecting the right stereo image light ray bundles along R R' to pass along the first optical axis $Z_1 Z_1'$, a first fixed horizontal deflector 7, and a second horizontal rotable deflector 8, having a vertical axis $Y_1 Y_1'$. There is also shown a first vertical deflector 9 and a second vertical deflector 10, which may be total internal reflecting prisms or mirrors to vertically deflect the left stereo image light ray bundles along L L' to pass along the second optical axis $Z_2 Z_2'$.

The light ray bundles of the right and left images converge to the optical center of the lens through an angle determined by the field of view of the lens. For example, in a 50 mm lens, the field of view is 24° horizontally and about 12° vertically. With glass elements this divergence is decreased by a factor of n, the index of refraction of the glass. Thus, the horizontal divergence of these light ray bundles in glass, in the horizontal plane, is $\sim 18°$, or 9° on each side of the central axis of the light ray bundles. The vertical divergence of these light ray bundles in glass is $\sim 18°$, or 4° above and below the axis of the light ray bundles. To accommodate this converging light ray bundle through the first horizontal deflector, a 45° right angle prism 7, the central ray CD of the ray bundle R R' diverges from the axis $Z_1 Z_1'$. To enable convergence to near or far images, a set of achromatic prisms 11 and 12 is provided. These achromatic prisms have a deviation of about 5° each, or a total of about 10°. Alternatively, in the embodiment shown in FIG. 14, the first horizontal deflector is a right angle prism having an angle $\eta \approx 50°$.

To provide convergence control, for example, from $\infty$ to 1 meter, the adjustment of the angle $\theta$ between the optical axes R R' and L L' of the right and left images is from 0° to about 4°. A rotation of the second horizontal deflector 8 by $\alpha$ degrees changes the reflected ray DE by $2\alpha$, and changes the direction of the ray CD by $2(2\alpha)=4\alpha$ at the first horizontal deflector 7. As the second horizontal deflector 8 is rotated 1° around the vertical axis $Y_1 Y_1'$ by the worm gear 13 and the worm 14, the convergence angle $\theta$ changes 4°. The deflector 8 may have various forms. In one embodiment it is a cube with a half-silvered diagonal plane covering the entire lens aperture. In a second embodiment, it is a totally reflecting prism across only the half plane below the optical axis Z Z' of the lens 6, and a fixed or rotatable solid cube occupies the half plane above the optical axis Z Z'.

Figure 6:
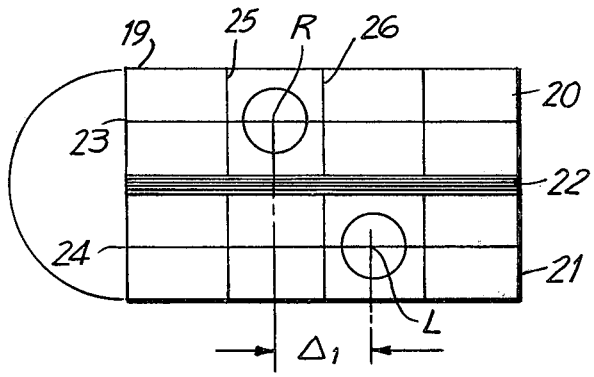
FIG. 6 shows the right and left images as they appear in the film gate and image plane of the viewfinder.
Figure 7:
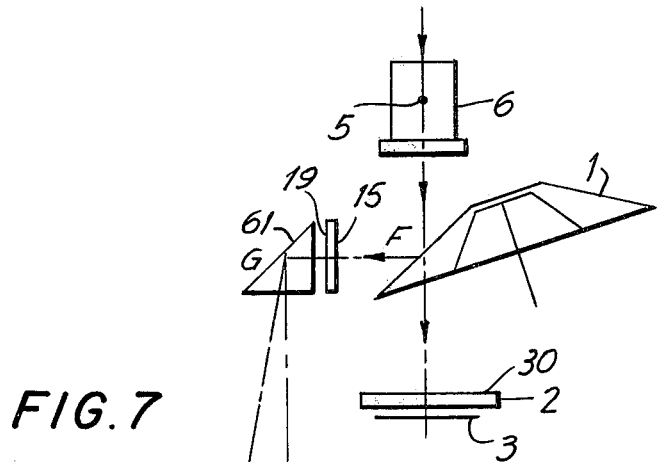
FIG. 7 shows a diagrammatic plan view of a reflex motion picture camera modified according to this invention, and provided with a binocular 3-D viewfinder.

The left and right light ray bundles diverge from a point O in the object space which is at a distance p from the optical center 5 of the lens 6. Simultaneously, as the convergence angle $\theta$ is changed, the change in the distance p is accomplished by rotating the lens worm gear 33 and worm 34. The worm gear 33 rotates the lens 6 and moves it back and forth along its axis Z Z' to focus the image at the plane of the gate 2. The film 3 passes the gate 2, which is divided into two areas, an upper image in a first area 16 for the right image, and a lower image in a second area 17 for the left image. The right and left, upper and lower images 16 and 17, respectively, are separated by a dark bar 18. The dark bar 18 provides a sharp upper and lower border to the projected images upon the screen, as described in related application, Ser. No. 329,733, filed Feb. 5, 1973, now U.S. Pat. No. 3,851,955. Referring to FIGS. 6 and 7, the shutter 1, shown in cutaway section, has a reflecting surface which deflects the image along a path FG toward the diffusion screen 15, and mutually extinguishing filters 19 at the image plane of the viewfinder 4.

Referring to FIG. 6, the mutually extinguishing filters 19 have upper and lower areas 20 and 21, respectively, separated by the dark bar 22. Horizontal cross hairs 23 and 24 bisect the areas 20 and 21 respectively. Vertical cross hairs 25, 26, etc. extend across the areas 20 and 21. The horizontal displacement $\Delta$ between a right inverted image R of point O and left inverted image L of point O on areas 20 and 21 respectively may be calibrated against the convergence angle $\theta$; for example at $\Delta_1=0$, $\theta=0$ and the convergence distance $p=\infty$; at $\Delta_1=5$ mm, $\theta=4°$, and the convergence distance $p=1$ meter. The horizontal cross hairs 23 and 24 are used to vertically align the right and left images at infinity and to thus establish a fixed reference distance separating the upper and lower images. If a constant distance is not maintained between the upper and lower, right and left images respectively, then these distances must be adjusted during the printing of the film. This difficult and costly procedure is eliminated by the present invention.

Referring now to FIGS. 2 and 3, the paths of the light ray bundles of the right and left images are now traced. The light ray bundles of the right image proceed along the axis R R' through the first converging achromatic prism 11, being reflected at D by the first horizontal deflector 7 along the path DE, whence the rays are reflected by the second horizontal rotable deflector 8 along the path EF, passing upward through the optical center 5 of the lens 6, to the upper area 16 at the gate 2. The light ray bundles of the left image pass along axis L L' through the second converging achromatic prism 12 toward the first vertical deflector 9, are reflected at A vertically along path AB, and are reflected again by the second vertical deflector 10, along the line BC; then downward through the optical center 5 of the lens 6 to the lower area 17 of the gate 2.

The path BC passes through the glass block 27, which may be an extension of the second horizontal deflector 8. To provide vertical adjustment of the right and left stereo images at the film gate 2 and the focal plane of the viewfinder 4, the second vertical deflector 10 may be rotated through a few degrees about the $X_1 X_1'$ axis. When the appropriate vertical separation of the right and left images is achieved, this position is locked. The first and second vertical deflectors 9 and 10 displace and rotate the light ray bundles from the axis L L', respectively, by a vertical distance $D_2$, and an angle $\gamma$, toward the second image area 17, along the second optical axis $Z_2 Z_2'$.

The first set of mutually extinguishing filters 19 comprises a right polarizing filter 28 and a left polarizing filter 29, which may, for example, have a vertical polarizing axis and a horizontal polarizing axis, respectively; shown mounted and laminated to faces of the rotable second horizontal deflector 8 and the glass block 27.

Figure 4:
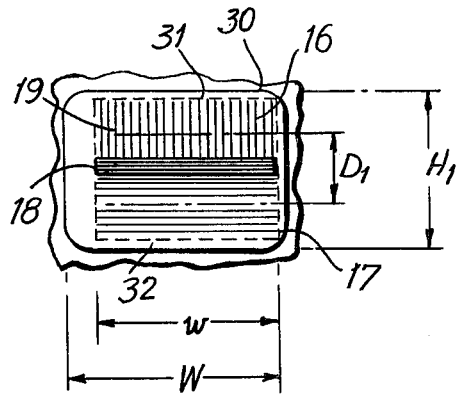
FIG. 4 is a drawing of polarized filter elements utilized in the gate and viewfinder of the camera.

FIG. 4 shows the second set of mutually extinguishing filters 30 which comprise polarizing filters 31 and 32 with a dark bar separator strip 18 between them, laminated between or on glass or plastic and mounted in proximity to the film strip 3 at the gate 2. The filter set comprises an upper polarizing filter 31 in area 16, polarized with its axis of polarization vertical, and the lower polarizing filter 32 in area 17 is polarized with its axis of polarization horizontal.

The camera lens 6 focuses the object at intersection point O onto the plane of the film 3 at the gate 2. The lens position along the optical axis Z Z' is controlled in the usual manner by rotating the lens barrel, using a worm gear 33 turned by the worm 34 on shaft 35. The convergence angle $\theta$ of the right and left optical axes R R' and L L' respectively to their intersection point O varies from 0° to 4°, controlled by a rotation of the second horizontal deflector around the $Y_1 Y_1'$ axis, which passes vertically through its diagonal plane. The deflector 8 is mounted on the shaft of the worm gear 13, which also has $Y_1 Y_1'$ as its axis. The convergence control shaft 36 rotates the worm 14, worm gear 13 and deflector 8. To automatically coordinate convergence and focus, the shafts 35 and 36 may be mechanically interlocked. Light ray bundles carrying both the right and left images are mixed and pass through the same lens 6 which is a common channel for these rays. These mixed light rays are distinguished and separated into the right and left adjacent images on a single frame of the film 3 by the first and second sets of mutually extinguishing polarizing filters.

Thus, the ray bundle carrying the right image is polarized vertically by polarizing filter 28 and is extinguished by the lower horizontally polarizing filter 32 at the lower area 17 of the film gate 2, and is admitted by the upper vertically polarizing filter 31 at the upper area 16 of the film gate 2; and the ray bundle carrying the left image is polarized horizontally by the polarizing filter 29, and is extinguished by the upper vertically polarizing filter 31 at the upper area 16 of the film gate 2, and admitted by the lower horizontally polarizing filter 32 at the lower area 17 of the film gate 2. The right and left images thus appear only in the appropriate areas 16 and 17 on the film strip 3 above and below the central dark bar separator strip 18.

The angular adjustments of the second horizontal deflector 8 around the vertical axis $Y_1 Y_1'$ and of the second vertical deflector 10 around the horizontal axis $X_1 X_1'$, respectively, enable the right and left images to be centered in their respective positions at the gate and at the viewfinder. The angular adjustment of second horizonal deflector 8 controls the convergence angle $\theta$ of the light ray bundles carrying the right and left images.

Figure 5:
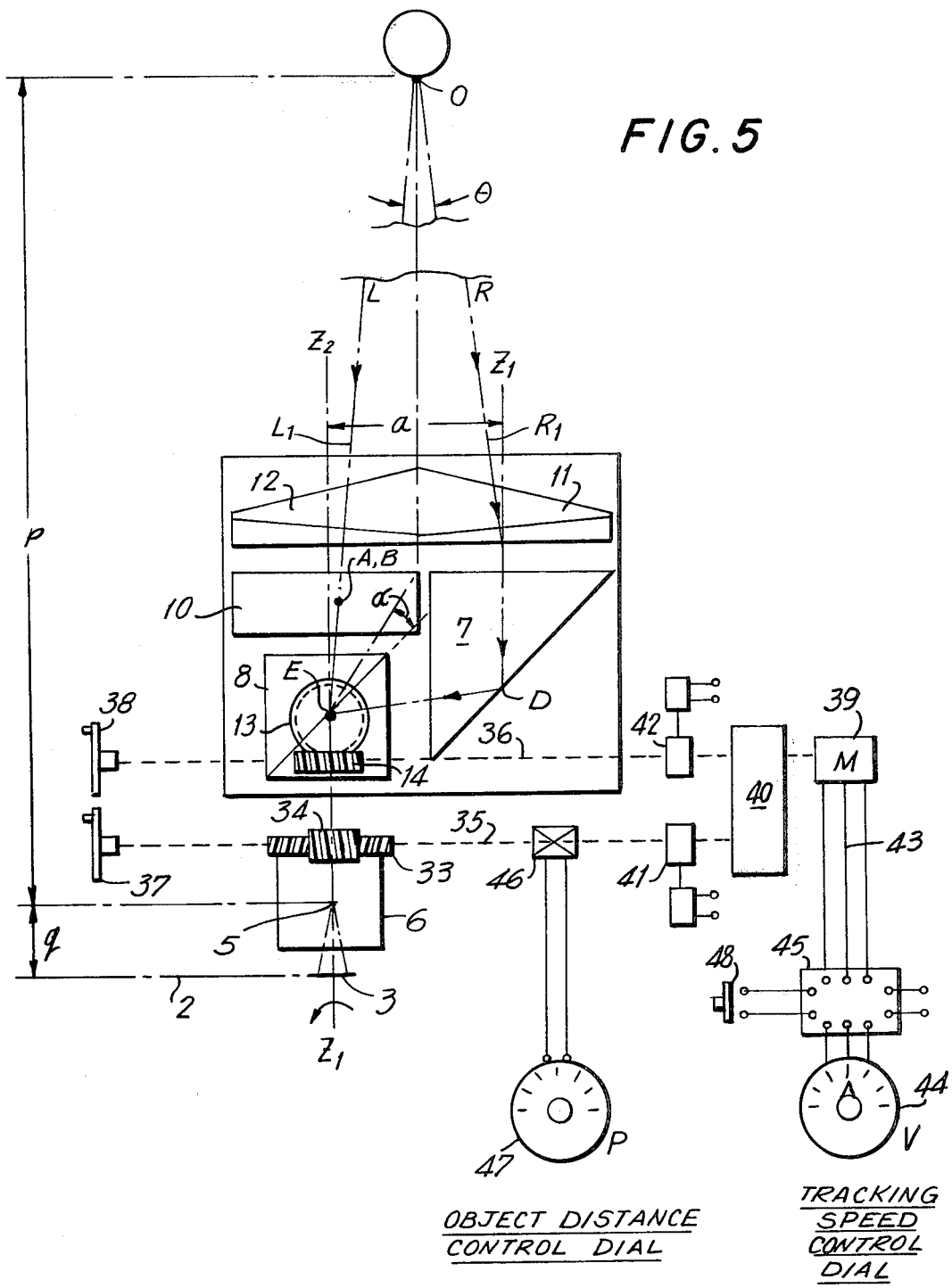
FIG. 5 shows an electrochemical system for controlling convergence and focus independently or simultaneously.

Referring to FIG. 5, shafts 35 and 36 are provided with the external calibrated dials 37 and 38, respectively. To vary the divergence of the right and left images, the second deflector 8 is turned through an angle $\alpha$ from 0° to about 1°, by the worm gear 13, which may have for example 360 teeth. A single turn of the shaft 36 then causes the deflector 8 to turn through an angle of 1°. The dial 38 may be calibrated in 100 divisions, of 0.01° per division. Assuming that, for an object O from infinity to 1 meter from the lens center 5 the lens worm gear 33 requires a rotation of 45° to vary the distance q from the lens center to the image plane 2 on the film strip 3; then one turn of the shaft 35 rotates gear 33 by 45°, or ⅛ turn. In this case, the gear combination 33, 34 may comprise spiral gears with an 8:1 ratio.

A motor 39 drives the gear box 40 and shafts 35 and 36 through the clutches 41 and 42, respectively. The motor/gear box 39,40 may be an integral assembly, powered via electric leads 43, and its speed by control dial 44 via a conventional speed control electric circuit 45. This drive and clutch mechanism allows the coupling or independent control of the convergence angle $\theta$ of the axes L L' and R R' and the focus onto the object O at a distance p from the optical center 5 of the lens 6. When the clutches are engaged, the difference angle $\Delta\alpha$ and the difference distance $\Delta q$ of the optical center 5 of the lens 6 to the film plane 3 are coupled, and $\Delta q$ is proportional to $\Delta\alpha$.

To control tracking toward or away from the camera of the convergence and focus, the motor 39 may be reversed by the speed control dial 44. The clutches 41 and 42 may be disengaged and the dials 37 and 38 set to independently focus and converge. For example, by rotating the second horizontal deflector 8, the image axes may be converged upon a near or far object. The focus may be independently adjusted near or far. If it is required to simultaneously converge and focus upon an object, and if the object is moving toward or away from the camera, the focus and convergence may simultaneously track either rapidly or slowly by engaging the clutches 41 and 42, setting the dial 44 for positive or negative tracking speed (object moving toward or away from the camera) depending upon the motion of the object relative to the camera; and the dial 47 for the distance p of the object to the camera which controls the shaft angle differential 46. Push button control 48 actuates the tracking. The cameraman simultaneously observes the right and left images at the diffusion screen 15, using a monocular eyepiece on the viewfinder, such as 53, without prism or polarizer. The images then are seen one over the other just as they will appear on the film. Alternatively, utilizing the two binocular eyepieces 53 and 54, the image is seen in 3-D as herein described in connection with FIG. 7. The cameraman is thus able to automatically track or independently control the focus and convergence.

When there is little or no vertical parallax, all objects on the same level will appear on the same horizontal line. With vertical parallax, left and right images of far and near objects may be aligned horizontally on one image, but the same objects will appear vertically displaced on the other image. For a satisfactory 3-D presentation, this condition cannot be tolerated if the vertical parallax exceeds a few percent of the picture height. If the vertical deflection $D_2$ and angle $\gamma$ are not correctly adjusted, a vertical parallax of near and far images will be observed. Vertical and angular adjustments $D_2$ and $\gamma$, respectively, may be provided on the first and/or second vertical deflectors, to adjust the vertical deflection distance $D_2$ and direction of the left image light ray bundles into a path along the second optical axis $Z_2 Z_2'$.

SYMBOLS a = interocular distance
b = width of bar separator
d = differential
f = focal length of lens
h = height of stereo image
k, $k_1$, $k_2$, $k_3$ = constants
n = index of refraction of the glass elements
p = distance of the object to the optical center of the lens
$p_o$ = initial distance of object to center of camera lens
q = distance from optical center of lens to plane of film
rpm = revolutions per minute
t = time
w = frame width of stereo image
$z_o$ = distance between the optical center and vertical deflection path AB
$D_1$ = distance between centers of upper and lower images
$D_2$ = AB, the vertical deflection distance
H = standard frame height
K = $4f^2/a$
V = velocity of approach or recession of object from camera
W = standard frame width
$\alpha$ = angle by which reflecting plane of deflector differs from 45° position of that plane relative to Z axis
$\beta$ = angle through which lens worm gear is turned
$\gamma$ = angle between axes $Z_1 Z_1'$ and $Z_2 Z_2'$
$\delta$ = distance between plane parallel surfaces
$\delta'$ = apparent decrease in the length of the light path between parallel surfaces separated by a distance $\delta$ in a medium having an index of refraction n
$\Delta_1$ = horizontal displacement between corresponding points on right and left images
$\theta$ = convergence angle between intersection of optical axes L L' and R R'
$\omega_c$ = angular velocity of convergence shaft
$\omega_f$ = angular velocity of focus shaft
$\Delta$ = difference
$\eta$ = angle between side and diagonal plane of right angle prism which comprises the first horizontal deflector.

MATHEMATICAL OPTICS SECTION

For a simple lens system:

$$1/f = 1/p + 1/q \qquad (1)$$

Solving for a distance between a film plane and the optical center, q:

$$q = fp/(p-f) \qquad (2)$$

Differentiating:

$$(dq/dp) = -f^2/(p-f)^2 \qquad (3)$$

Since usually, p >> f:

$$dq \approx -(f/p)^2 \cdot dp \qquad (4)$$

For small $\theta$, the relationship between the distance of the object to the optical center of the lens p and the interocular distance a is:

$$p \approx a/\theta \qquad (5)$$

Differentiating:

$$dp = (-a/\theta^2) \, d\theta \qquad (6)$$

From (4), (5), and (6):

$$dq = -(f\theta/a)^2(-a/\theta^2) \, d\theta \qquad (7)$$

which reduces to:

$$\Delta q = (f^2/a) \, \Delta \theta \qquad (8)$$

The relationship between the change in the angle of the second horizontal deflector $\Delta \alpha$ and the change in the angle $\Delta \theta$ between the optical axes of the right and left images is:

$$\Delta \theta = 4 \, \Delta \alpha \qquad (9)$$

From (8) and (9):

$$\Delta q = (4f^2/a) \, \Delta \alpha = K \, \Delta \alpha \qquad (10)$$

The change in $\Delta q$ is usually accomplished by turning the barrel of the lens 6 through an angle $\Delta \beta$. The barrel is threaded into the lens mounting which axially shifts the lens a distance $\Delta q$ for a change of barrel angle $\Delta \beta$. That is:

$$\Delta \beta = k \, \Delta q \qquad (11)$$

From (10) and (11):

$$\Delta \beta = k \, K \, \Delta \alpha = k_1 \, \Delta \alpha \qquad (12)$$

Equation (12) shows that the angle $\Delta \alpha$ through which the second horizontal deflector 8 is rotated to adjust the convergence is directly proportional to $\Delta \beta$, the angle through which the lens worm gear 33 is turned to obtain a sharp image on the film plane at the gate 2.

For an interocular distance fixed at a=67 mm, the average constant distance between the right and left human eyes, the constant term $K=4f^2/a$ is about 38 for a 25 mm lens, 150 for a 50 mm lens, and 300 for a 70 mm lens.

The angle $\theta$ between the optical axes of the right and left lenses varies from zero at $p=\infty$ to about 4° at $p=1$ m, usually the closest working distance to a camera. Consequently $\Delta\alpha$ varies from zero to $\approx 1°$.

EXAMPLE 1

Given: A lens of focal length f=50 mm, the interocular distance a=67 mm, and $\theta$ set initially at 0, with the object distance $p=\infty$.

The object distance is changed to p=1 m, or 10 mm, by rotating the second horizontal deflector 8 through an angle $\Delta\alpha$.

Find:
(1) $\Delta\theta$
(2) $\Delta\alpha$
(3) $\Delta q$

Solution:
From (5):

$$\theta = a/p = 67/10^3 \text{ radians} = 6.7 = 10^{-2} (180/\pi)°$$

$$\theta = 3.8°$$

$$\Delta\theta = 3.8 - 0 = 3.8° \quad \text{Ans. (1)}$$

From (9):

$$\Delta\alpha = \Delta\theta/4 = 0.96° \approx 1° \quad \text{Ans. (2)}$$

From (10):

$$\Delta q = (4f^2/a) \Delta\alpha$$
$$= [4(50)^2/67] \cdot 0.96 (\pi/180)$$
$$\approx 2.5 \text{ mm} \quad \text{Ans. (3)}$$

EXAMPLE 2

In FIG. 5, dial 38 turns through 360° to rotate the second horizontal deflector 8 through $\Delta\alpha=1°$ to bring the convergence from $\infty$ to 1 m. At the same time the dial 37 is turned through 360° to adjust the angle $\Delta\beta$ through 45° for sharp imaging on the film plane. Find the constant k:

From (12):

$$k = \Delta\beta/\Delta\alpha$$

$$k = 45/1 = 45 \quad \text{Answer to Example No. 2}$$

From (5), (9) and (12):

$$\alpha = k_2/p \quad (13)$$

$$\beta = k_3/p \quad (14)$$

$$(dp/dt) = V \quad (15)$$

$$\omega_c = rpm_c = (d\alpha/dt) = -(k_2/p^2)(dp/dt) = -k_2 V/p^2 \quad (16)$$

$$\omega_f = rpm_f = (d\beta/dt) = -(k_3/p^2)(dp/dt) = -k_3 V/p^2 \quad (17)$$

From (16) and (17):

$$(\omega_c/\omega_f) = (rpm_c/rpm_f) = (k_2/k_3) = k_4 \quad (18)$$

Integrating (15) and evaluating the constant of integration:

$$p = p_o \pm Vt \quad (19)$$

Referring to FIG. 5, dial 44 sets the estimated speed $\pm V$ of the object toward or away from the camera, and dial 47 sets the approximate distance $p_o$ of the object from the camera. Dial 47 turns with time. To start, set the dial 47 at $p_o$ and the dial 44 at $\pm V$; then the dial 47 will turn according to (19); thus, V and $p_o$ are always under the control of the cameraman.

For lenses 6 of different focal lengths, the angle $\gamma$ between the optical axes $Z_1 Z_1'$ and $Z_2 Z_2'$, shown in FIG. 3, changes. The angle $\gamma$ also changes as q, the distance of the image plane to the optical center of the lens changes, as the focal plane to the object being photographed is changed, but this change is small. From FIG. 3:

$$D_1 = \gamma q \quad (20)$$

$$D_2 = \gamma z_o \quad (21)$$

Hence:

$$D_2 = D_1 z_o/q \quad (22)$$

From (2) and (22):

$$D_2 = (D_1 z_o/f)(1-f/p) \quad (23)$$

Since $f \sim 50$ mm and $1000 < p < \infty$; $0.04 < f/p < 0$
32 mm < f < 100 mm $D_1 = 9.8$ mm $z_o \approx 100$ mm Hence:

$$30 \lesssim (D_1 z_o/f) \lesssim 10 \quad (24)$$

For a 50 mm lens $\gamma$ is computed:

$$\gamma = 9.8/50 \approx 0.2 \text{ radians}$$

$$\gamma = 0.2 \times 57.2 \approx 11.4° \quad (25)$$

The conclusion is that $D_2$ varies a maximum of 4% from $\infty$ to 1 meter and hence may be held constant without troublesome vertical image parallax. However, in changing lenses from 30 to 100 mm focal length the angle will change by a factor $\sim 3$; and provision must be made to vary $D_2$.

The calculation for $D_2$ is made for an air path. Since most of the distance travelled by the light ray along the axis $Z_2 Z_2'$ is in glass having an index of refraction n, the angle $\gamma$ is decreased to $\approx \gamma/n$ and $D_2$ to $\approx D_2/n$.

Referring to FIG. 7, there is diagrammatically shown a plan view of the 3-dimensional camera of this invention which includes a binocular view-finder 4. The rays reflected by the rotating shutter 1 in the direction FG are imaged upon a third mutually extinguishing filter set and reticle 19 and diffusion screen 15 at the image plane shown in FIG. 6. A rear view projection or diffusion screen 15 makes the projected images visible in the viewfinder. The third mutually extinguishing polarized filter set and reticle 19 is similar to the second mutually extinguishing filter set 30 at the gate 2, except that it has inscribed horizontal reticle lines 23, 24 and vertical reticle lines 26, 27, etc. The binocular viewfinder 4 comprises binocular inverting eyepieces 53 and 54 in front of the cameraman's eyes, 55 and 56. Polarizers 57 and 58 are respectively polarized horizontally and vertically so that the right eye 56 sees only the image appearing on area 20 and the left eye 55 sees only the image appearing on the area 21. The two images are brought into vertical alignment by prisms 59 and 60. Thus, with this binocular viewer, the cameraman reconstructs a 3-dimensional image as it is photographed by the camera, and as it will be seen when projected on a screen. The 3-dimensional binocular viewer shown in FIG. 7 may be employed in other applications. For example, in the editing of 3-dimensional motion picture film, it is necessary for the editor to see the images in 3-D. This may be accomplished by inserting a polarizing filter such as is shown in FIG. 4 over the pair of images on the film in the gate of the Moviola device, and utilizing the binocular viewing device just described; whereby the motion picture images will be superimposed and fused into a 3-dimensional image by the editor.

It is within the purview of the present invention to vary the interocular distance a. An increase in the interocular distance a has been employed in the prior art to increase the depth perception, particularly for distant scenes. In accordance with equation (10) this may be accomplished by an increase or decrease in the constant factor a in this equation and a corresponding gear ratio change. To change a, the distance between the horizontal deflectors 7 and 8 is vaired. The first and second horizontal deflectors may be mounted upon separate structures whose distance from each other along the X axis may be controlled in any suitable manner, as for example, a screw mechanism (not shown). The human eyes have a fixed interocular distance a, and it is natural to see 3-dimensional scenes in this manner. The present device operates in an entirely satisfactory manner with a fixed interocular distance a, which may be chosen at 67 mm, the mean interocular distance of the human eyes. However, for special applications, a means may be provided to vary the interocular distance a.

There is thus provided a 3-dimensional camera device which enables the motion picture photography of stereo image pairs with a relatively simple device. With this device, the cameraman views the stereo pairs as they are photographed onto single frames of a single film strip while simultaneously or independently controlling the convergence and focus, and moving objects may be "tracked" under control of the cameraman. In this manner, 3-dimensional effects are obtained which increase the depth perception of the projected images by the viewer while enhancing their realism and dramatic impact.

In another embodiment of this invention, mutually extinguishing polarizers are mounted with their polarizing axes mutually at 90° and respectively at ±45° to the horizontal. A first set of such filters may be placed between the lens 6 and the first and second positions; a second set of such filters at the film gate 2; and a third set of such filters at the diffusion screen 15 at the image plane of the viewfinder. Referring to the first set of filters in front of the lens 6, there is one polarizer in the half plane above the lens axis Z Z', and the other polarizer in the half plane below the optical axis Z Z'. An advantage of utilizing the ±45° directions is that the right and left image intensities are more nearly balanced, and the depolarizer, quarter or half wave plates may be eliminated. Further, strain in the glass optical elements will not detract from the blocking effect of the first and second sets of mutually extinguishing filters. With the polarizing axes at ±45° for mutually extinguishing filters, the reflection from a polished metal surface; that is a half silvered surface or the reflecting surface of the shutter of a reflex camera, introduces a rotation of the planes of polarization by 90°. As a consequence, to provide extinction, the third set of mutually extinguishing filters 19 at the diffusion screen 15 at the image plane of the viewfinder has its planes of polarization turned through 90° relative to the second set of mutually extinguishing polarizers at the gate and the polarizers 28 and 29 are both at +45°; after reflection from a half silvered plane the light from DE is rotated through 90°. In other respects with the ±45° polarizers, this system functions as previously described.

In the embodiments described herein, the R R' axis is displaced by the interocular distance a to the right of the lens axis Z Z', and the L L' axis is approximately in line with Z Z'. In an alternate embodiment, the L L' axis may be displaced to the left and R R' may be approximately in line with Z Z'.

A 3-dimensional camera device according to this invention which utilizes a half silvered cube as the second horizontal deflector requires about three stops additional opening on the camera lens since two parallel efficient polarizers transmit 33 to 40% light and the half silvered horizontal deflector cube reflects and transmits about 45% of the light; other losses in the system being small with nonreflecting surfaces on the optical elements. However, when the second horizontal reflector is a total internal reflecting prism in the lower half plane, no light is lost upon total internal reflection, and about 1.7 stops are required.

In another modification, achromatic prisms 11 and 12 may be combined with the first horizontal deflector and the first vertical deflector, respectively, rather than as the separate elements shown herein.

In U.S. Pat. No. 4,017,166, indicium means is shown to ascertain that the projected image is in true stereo. The indicium means is a colored dot or symbol imprinted on the edge of the film outside of the frame line. Such indicium is important to ascertain true stereo in editing, splicing and projecting the film.

Figure 8:
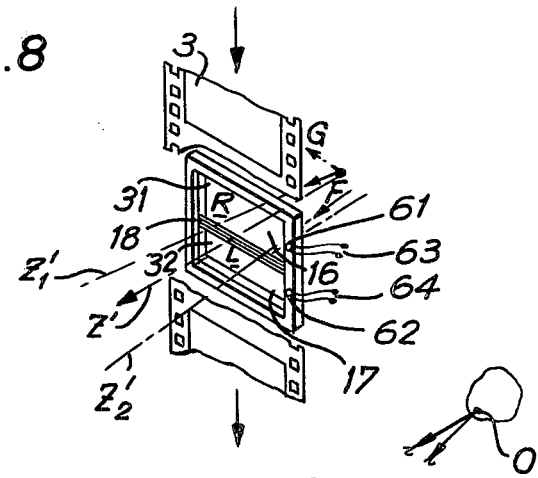
FIG. 8 shows the perspective view of a film gate in a 3-dimensional camera device showing light sources for indicium marking on the film.

Referring to FIG. 8, an improvement of this invention utilizing the invention shown in related U.S. Pat. No. 4,107,166, is its application to a 3-D camera device, in which we incorporate in the gate 2 small colored light sources, for example, L.E.D. light sources 61 and 62; for example, a red light and a green light producing red and green dots corresponding to the upper and lower images. The gate has a dark bar mask 18 horizontally located along the center of the frame dividing the film frame into two areas, 31 and 32, which comprise the right and left images respectively. Along the sides of the film gate and flush with the surface of the gate there are mounted two minute light sources 61 and 62. The light sources 61 and 62 may be of the L.E.D. type which may be, for example, red and green respectively, are actuated by small potential differences 63 and 64. These colored dots are printed onto the film just outside the frame line while it is stopped during the exposure of the film to the scene. By this means, the film is automatically printed with the indicia markings on the side of the film just outside the frame line. Switch means, not shown, actuated by the camera mechanism, cause the light to turn on by applying voltage through leads 63 and 64 to cause the L.E.D. lights 61 and 62, respectively, to turn on only when the film is stopped in the gate.

Figure 9:
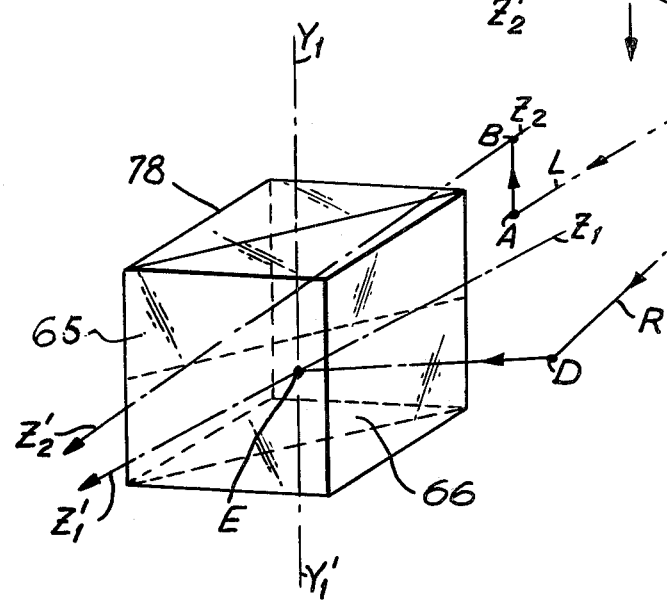
FIG. 9 shows a reflecting transmitting cube according to this invention.
Figure 10:
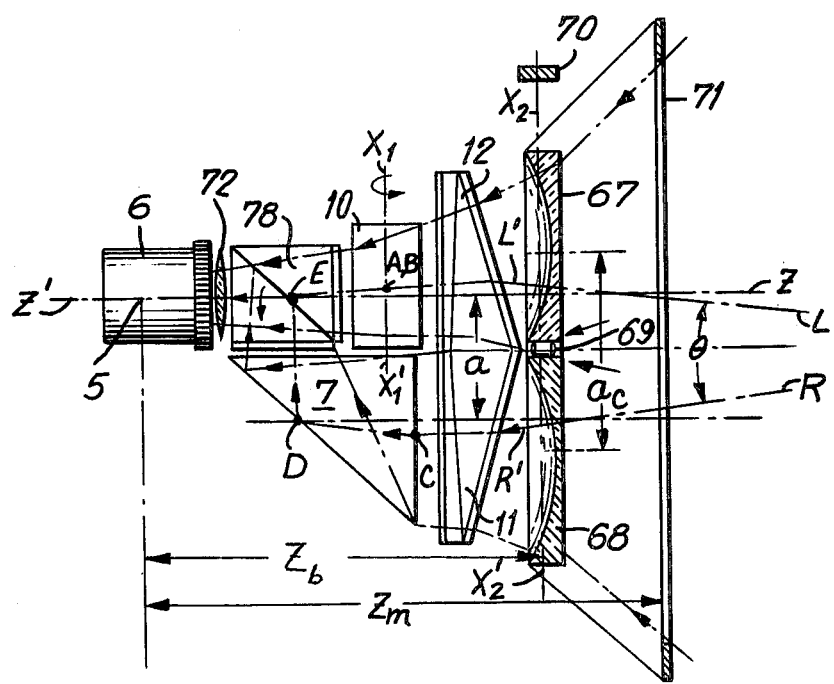
FIG. 10 shows a plan view of another embodiment of this invention having an exterior rectangular aperture and a black bar at the gate between the images.
Figure 14:
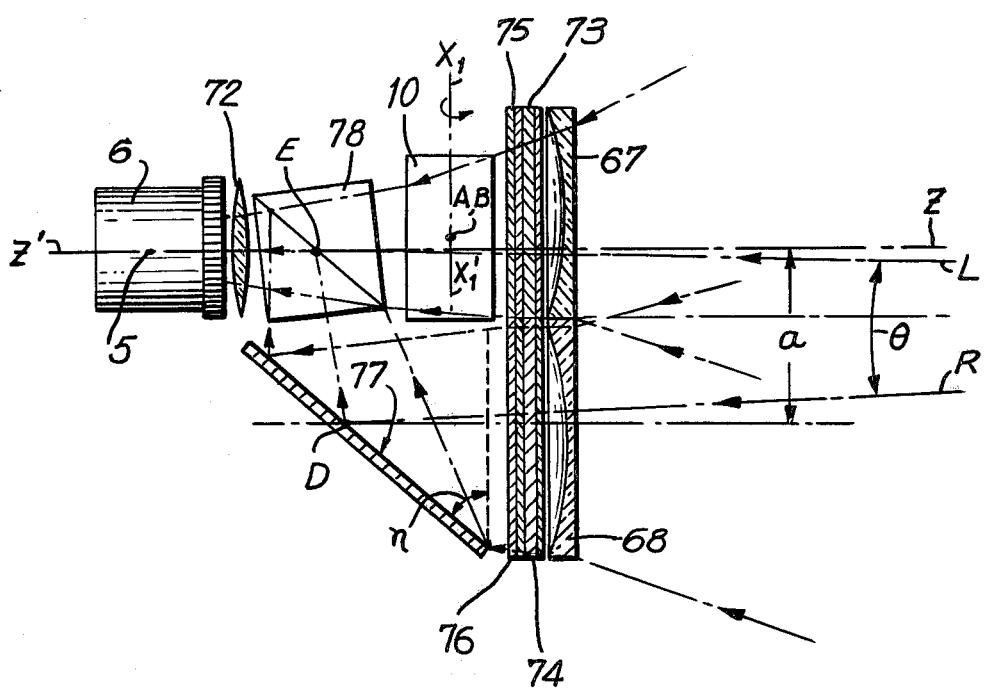
FIG. 14 shows a plan view of another embodiment of this invention.

Another modification of this invention to improve the light efficiency of the device of this invention is the substitution for the half silvered mirror at the diagonal reflecting plane of the cube 8 in FIG. 1 with the cube 78 shown in FIGS. 9, 10, and 14, in which the upper half of the area is now transparent and the lower half of the area is fully silvered. The result is to increase the light transmission by a factor of about 2.2.

Referring to the Figure in which the cube 8 contains a half silvered reflecting plane, and mutually extinguishing filters are used, then the total light loss in the 3-D camera device is about three stops.

With the structure shown in FIG. 9, and the mutually extinguishing filters above described, the light transmission is about 25%, corresponding to a light loss of about 2 stops for the system.

In FIG. 9 there is shown a cube of glass divided into a diagonal plane having an upper area 65 and a lower area 66. The lower area 66 is plated with a high-reflectivity silver film; the upper portion of the plane is left clear.

When these two prisms are laminated to form the cube 8 as shown, the upper portion of the cube will transmit the light along the axis $Z_2 Z_2'$ and reflect light along the path $Z_1 Z_1'$. In other respects, the cube is the same as described.

Still another modification of this invention is the substitution of an outboard rectangular mask and dark bar at the aperture gate in lieu of the mutually extinguishing filters. While this construction sacrifices the compactness of the device hereinabove described, it has the advantage of increasing the light transmission by a factor of about 3.

By employing both of the above modifications, the light transmission is increased by a factor of 6, or by about 2.6 stops; the light thus approximating that obtainable without the 3-D attachment, which is free of additional optical elements; that is, the light loss is less than 1 stop.

In the embodiment shown in FIGS. 10, and 11 to 13, and particularly in FIG. 10, reference is made to the dark bar mask 18 at the film gate and a rectangular aperture 71 at the front of the camera. Without the mutually extinguishing filters it is found that the distances $Z_m$ between the optical center of the single lens at 5 and the aperture 71 must be substantial; for example, 30–60 cm, depending upon the sharpness of definition of the edge of the mask as imaged on the image planes 31, 32 in the gate. When the aperture 71 is close to the front of the camera; that is, when $Z_m$ equals the distance $Z_b$ as shown in FIG. 10, then the resolution of the outside of the aperture 71 is poor and edges of the images are fuzzy. Without dark bar mask, the images overlap at adjacent portions of the images areas 31 and 32. Referring to FIG. 10, a new and novel discovery was made applicable to the separation of the two images at the film gate without the light loss of the mutually extinguishing filters through the use of a wide angle aperture lens comprising plano-spherical negative lenses 67 and 68 in combination with an aperture mask 71, a black bar 18 at the gate, and subject to the condition that the 50 mm lens 6 is stopped to greater than F5, the image overlap was within the black bar and completely covered by it. In such a case the mutually extinguishing filters may be eliminated from the system and the result is an increase in light transmittance by a factor of about 2 stops; that is, the total loss in this system is about 0.5 stops.

However, when a 50 mm lens is employed without the negative lenses 67 and 68, then the image overlap may occupy about ⅓ of the 8.3° field (about 2.8°) on both sides of the black bar, and thus, in such instance, mutually extinguishing filters are necessary to separate the images in adjacent portions of areas 31 and 32. Therefore, in another embodiment of this invention, the polarizers and depolarizers are mounted together on a slide used together with polarized filters at the gate when required. However, where the negative lenses 67 and 68 are $>|-4|$ diopters, the camera may be utilized without mutually extinguishing filters.

FIG. 10 is the same as FIG. 2 described above, in which the mutually extinguishing filters may be eliminated. Instead of the mutually extinguishing light filters, an external rectangular aperture 71 is employed, located a distance $Z_m$ in front of the optical center 5 of the lens 6.

A wider angle of view is obtained by the incorporation of plano concave lenses just in front of the prisms 11 and 12 with a weak positive lens 72, usually meniscus convex, in front of the single lens 6. If lenses 67, 68, and 72 are spherical, the angular field is expanded in all directions. When these lenses are cylindrical, with axes horizontal, the field of view is compressed anamorphically in a vertical direction.

The plano spherical negative (concave) lenses, shown at 67 and 68, respectively, provide a wider angular field. An advantage of a wide angular field is that an object can be brought closer to the audience and appear to be in front of the screen, without touching the edges of the screen. With these plano spherical negative lenses utilizing an index of refraction of 1.686 (Euler Condition), approximated by a glass such as Lanthanum Crown 07 (Bournes Optical Glass) with an index of refraction of 1.680 and an Abbe No. of about 53, substantially no spherical or achromatic aberrations are introduced. The sharp focus is maintained by the addition of a thin meniscus spherical lens 72 immediately in front of the standard lens system 6. As an example, the plano spherical negative lenses 67 and 68 may each be $-3.75$ diopters, and the positive lens 72 about $+2$ diopters; together with a lens 6 having a focal length of 50 mm, the combination is equivalent to a focal length of 28 mm. Of course this combination can be utilized with the mutually extinguishing filters employed in FIG. 1.

The interocular distance a may be varied by changing the distance between the optical center of the lenses 67 and 68 in a horizontal direction. This is done by the control knob 70 and right and left hand screws (not shown) on axis $X_2X_2'$ by which the distance a between the optical centers of lenses 67 and 68 is varied. When the adjustment is small, a black resilient mask or bellows 69 may be placed between the adjacent edges of the lenses 67 and 68 to exclude the light coming between them.

The embodiments described hereinabove are interchangeable, utilizing slide-in elements. Thus the combination of aperture, negative lens, compensating lens and black bar constitute means for the elimination of image overlap under conditions set forth above.

Figure 11:
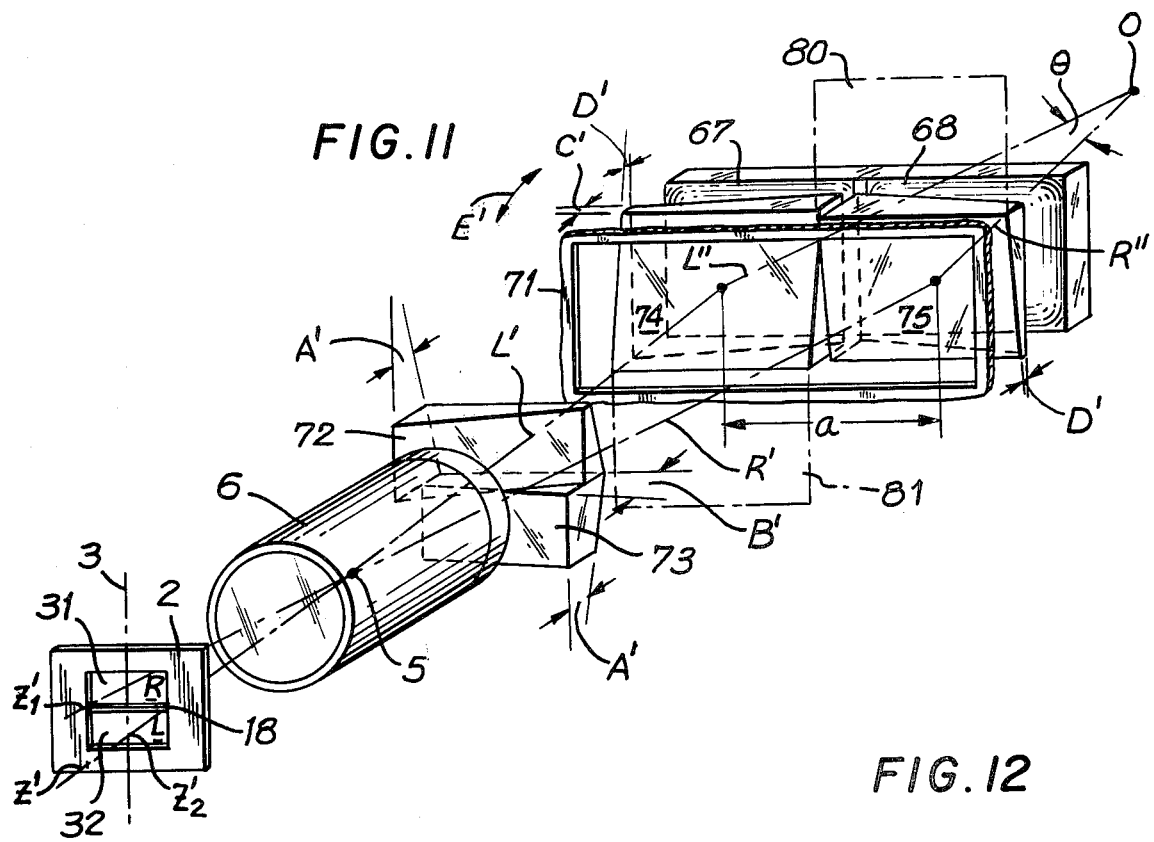
FIG. 11 is an isometric view of another embodiment of this invention.
Figure 12:
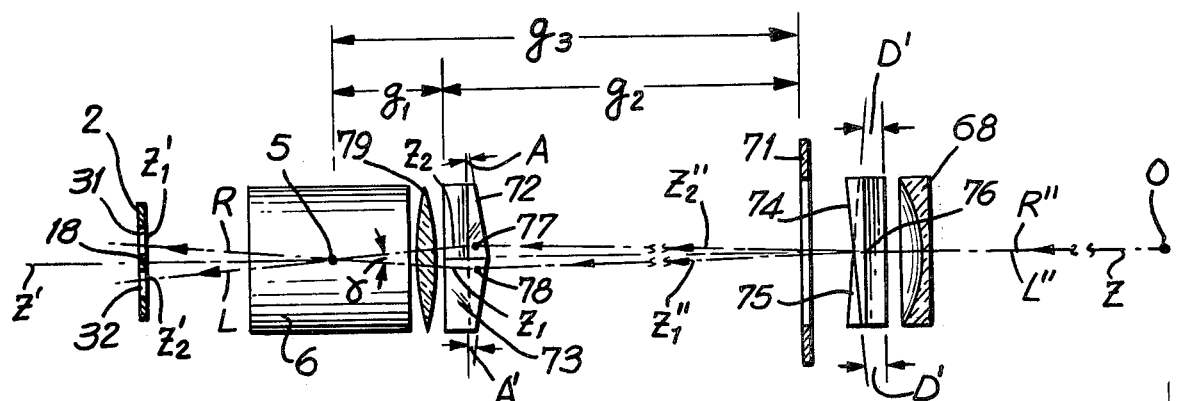
FIG. 12 shows a sectional side view of the device shown in FIG. 11.
Figure 13:
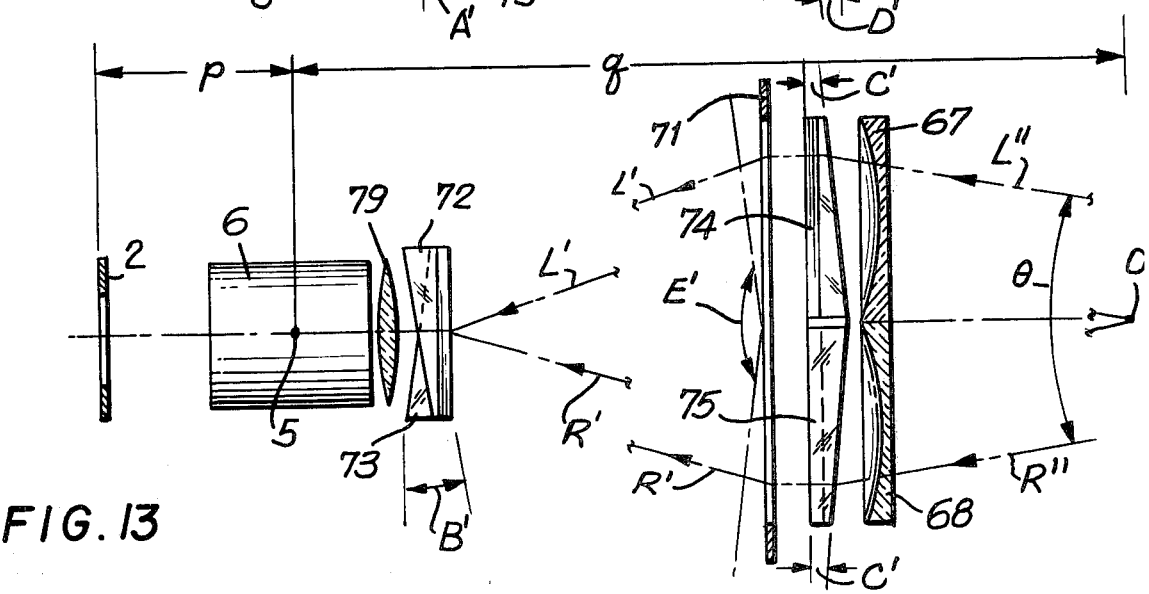
FIG. 13 shows a plan view section of the device shown in FIG. 11.

Referring now to FIGS. 11, 12, and 13, there is shown another embodiment of this invention. This embodiment employs certain principles described in U.S. Pat. No. 3,851,955, issued Dec. 3, 1974, to Arthur P. Kent and Mortimer Marks. In the said patent, an attachment to motion picture projectors for projecting 3-dimensional moving pictures was described. It was disclosed that a pair of prisms located about 25 cm from a monocular lens will converge a pair of images separated by a dark bar at the gate, and overlap the projected images onto a distant screen. In this embodiment, a modification of this principle is employed in a 3-dimensional camera, as will be apparent from the description herein below.

Advantages of this embodiment are the symmetry of the optical elements and the simplification in the optical elements by the substitution of compound prisms as first and second position deflectors, instead of reflecting elements. Disadvantages of this embodiment are that is is not as compact as the embodiment shown in FIG. 1, nor is the convergence varied as readily. An exterior aperture and central dark bar at the film gate may be used to define and separate the images at the film gate. The dark bar, the monocular lens, 2-position deflectors, and the control of convergence and interocular distance is provided by compound prisms instead of reflecting elements. The interocular spacing and the convergence angle is controlled by tilting these prisms in a manner analagous to the control of the vertical alignment in the aforesaid patent.

In FIGS. 11, 12, and 13, and object O in the object space provides ray bundle R'' for the right image and ray bundle L'' for the left image. External negative lenses 67 and 68 expand the field of view to provide a wide vertical and horizontal angle. The rays are bent by the prisms 74 and 75, which are preferably achromatic prsism, to form the ray bundles R' and L', respectively. These pass through the compound prisms 72 and 73 and finally pass along the first optical axis $Z_1 Z_1'$ through the optical center 5 of the lens 6 and to the center of the upper area 31 in the gate 2, thus providing the right image in aperture 31. Apertures 31 and 32 are defined by a central bar 18 within the film gate 2.

In a similar manner, the bundle of left rays L'' is deviated by compound prism 74 to form the ray bundle L', which is further bent by the compound prism 72 to pass along the second optical axis $Z_2 Z_2'$ to the center of the lower area 32 within the gate 2.

The compound prisms 74 and 75 have an angle C' in the horizontal plane and an angle D' in the vertical plane. These angles are opposed on opposite sides of the prisms 74 and 75, as shown in the drawing. In a similar manner the compound prisms 72 and 73 have an angle A' in the vertical plane and an angle B' in the horizontal plane, also being opposed as shown on the drawing and split along the horizontal half-plane of the lens 6. The result of the compound prisms is to produce deflections to bring the angle $\theta$ between the axes of the right and left ray bundles R'' and L'' in the horizontal plane, to an angle $\gamma$ between the axes of the right and left ray bundles R' and L' in the vertical plane.

The angular displacements and the construction of the compound prisms 74 and 75 and 72 and 73 may be understood by reference to FIGS. 12 and 13. In FIG. 12 there is shown a view taken in section in the vertical plane of the compound prisms, lens and film gate. In the drawing, right and left ray bundles R'' and L'' proceed along the Z Z' axis from an object point O in the object space being photographed. The ray R'' is first bent downward along ray path $Z_1''$ by the prism 75 which has an angle D' in the vertical plane. The ray $Z_1''$ then passes to the lower compound prism 73 close to the lens 6, and is bent upward along the first optical axis $Z_1 Z_1'$. In a similar manner, the left bundle of rays L'' is bent upward by the compound prism 74 following the path $Z_2''$ until it reaches the compound prism 72 whereupon it is bent at 77 along the second optical axis $Z_2 Z_2'$. Thus, light from the right bundle of R'' finds its way to area 31 within the film gate 2 and in a similar manner light from the left hand bundle of rays L'' finds its way to area 32 in the film gate 2. This is now accomplished by means of prism deflectors, in lieu of the reflector deflectors utilized in FIG. 1.

To understand FIG. 11, we may consider the optical transformation occurring if the images at the film gate were projected through the same optical system. In photography with this optical system, the same optical transformations occur in reverse. The compound prisms 72 and 73 cause a horizontal angular divergence and separation of the right and left images; and the compound prisms 74 and 75 angularly converge the said images to the object point O. Simultaneously, the compound prisms change the directions of the optical axes of the left and right ray bundles in the vertical plane to directions in the horizontal plane. Assume that the images 31 and 32 are projected through the lens 6, the compound prisms 72 and 73, and the aperture plate 71. The left image would pass through the compound prism 74; and the corresponding right image 81 would be blocked by the aperture plate 71. Similarly, the right image would pass through the right compound prism 75 and the corresponding left image 80 would be blocked by the aperture plate 71. Thus, the right image would pass only through compound prism 75; and the left image would pass only through the compound prism 74; the excess images being blocked by the aperture plate 71.

To shorten and lighten the system as described hereinabove, the mutually extinguishing filters must be employed; one set of mutually extinguishing filters may be placed at the aperture 71 of compound prisms 74 and 75, and the second set of mutually extinguishing filters may be placed at the gate at 31 and 32.

The interocular distance "a" may be varied by tilting the compound lenses 72 and 73 to vary the angle between the ray bundles R' and L'. The convergence angle $\theta$ may be varied by tilting the prisms, varying the angle E' between the prisms 74 and 75 as previously described in U.S. Pat. No. 3,851,955.

Various other improvements may be employed. For example, in the case of the mutually extinguishing polarizing lenses above noted, it is desirable to avoid the differences in image contrast due to natural reflected or scattered polarizing light from the object being photographed, due to the the different polarizing axes of the mutually extinguishing filters used to intercept the right and left ray bundles. To avoid this problem, the well-known achromatic quartz depolarizer may be employed between the first set of mutually extinguishing polarizing filters and the object being photographed. Alternatively, if it is required to maintain a non-glare horizontal polarizing axis for the elimination of glare an achromatic half-wave filter may be employed. Such achromatic filters are now well known in the art and have been described elsewhere[1].

1. "Improvement of Birefringent Filters 2: Achromatic Waveplates," Alan M. Title, *Applied Optics*, Vol. 14, pp 229-236, January, 1975.

A new and preferred embodiment is shown in FIG. 14. The reflecting element 77 is preferably a first surface silver-coated multilayer protected coating having a reflectivity of about 95%, adjusted to an angle $\eta \approx 50°$ between the diagonal plane and the optical axis. The cube 78 is the same as shown in FIG. 9. Alternatively, a first surface mirror in the lower half plane may be substituted for the cube 78. By increasing the angle $\eta$ from 45° in prism 9 in FIG. 11 to about 52° in this embodiment, the achromatic prisms 11 and 12 shown in FIGS. 1 and 2 are eliminated. In this embodiment, there are fewer optical elements in the light path and there results better resolution and decreased weight.

Alternatively, to a first surface reflector 77, a right angle totally-internal reflecting 50° prism may be used, in which case the glass must have an index of refraction exceeding 1.624.

The deflectors 9 and 10 preferably comprise first surface high reflectivity multilayer and silver coated mirrors providing 95% reflectivity for visible light. This provides an air path for the vertical distance AB as shown in FIG. 3. If the lens 5 has a 50 mm focal length, then the distance AB is about 36 mm. The interocular distance ED is usually made equal to the interocular distance between the human eyes; that is, about 67 mm.

It is known that the apparent decrease $\delta'$ in the length of the light path between plane parallel surfaces separated by a distance $\delta$ in a medium having an index of refraction n is given by:

$$\delta' = [(n-1)/n]\delta \qquad (26)$$

If the glass in the path ED=65 mm and if $n=1.52$, the 67 mm path is decreased by $(0.51/1.52)65 \approx 22$ mm; the apparent path distance ED=67−22=45 mm. The vertical path difference AB=36 mm; the difference is only 9 mm. Since the minimum distance to the object is usually about 1000 mm, there is only 0.9% difference in the distance to the focal plane. This is negligible since the depth of the focus is much greater and hence the right and left images will appear equally sharp on the film.

Plano spherical negative lenses 67 and 68 are optionally provided to increase the angular aperture to the field. To enable the left and right images L and R to enter the camera with the same image quality uneffected by natural admixed polarized light from the scene being photographed, the depolarizers 73 and 74 are placed in front of polarizers 75 and 76.

It will be understood that the optical elements are of the best quality glass, and particularly when polarized light is utilized, the elements must be substantially free of stress birefringence; that is, if viewed between crossed polarizers against a uniform bright light field, the field must appear uniformly dark. In this respect the cube 78 is most critical. With respect to prism 77 this problem can be avoided by placing the polarizer 76 between the adjacent face of prism 77 and cube 78. This has the additional advantage of increasing the length of the light path through the glass, making the vertical and horizontal displacements more nearly equal. If vertical deflectors 9 and 10 are first surface mirrors with an air path between them, there is no stress birefringence and polarizer 75 may remain in the position shown.

In FIG. 3, a mechanical linkage (not shown) may be used to vary the angle $\gamma$, the distance $D_2$, and the angle of the deflectors 9 and 10 to maintain zero vertical parallax as the lens focus changes from far to near. Since this is a second order effect, it is usually omitted, but may be required for the utmost precision. Such a linkage may be made to the shaft 35 which controls the displacement $\Delta q$ in any suitable manner.

In lieu of first surface metal reflectors, it is preferred to use the new multilayer reflectors which have 99% reflectivity[2].

[2]. No. 20D20BD.1 manufactured by Newport Research Corporation, 18235 Mt. Baldy Circle, Fountain Valley, CA 92708.

In FIG. 14, in lieu of rotating the cube 9, the deflector 77 may be tilted by changing the angle $\eta$.

Various other embodiments may be made by those skilled in the art which will fall within the scope of this specification and appended claims.

Having thus described the invention, what we wish to claim is:

1. In a 3-dimensional camera device for photographing an object space in 3 dimensions from a first and a second position separated by an interocular distance, first and second light ray bundles from said object space to said first and second positions, a monocular lens, a first optical axis and a second optical axis through said lens, a film gate, a film frame at said film gate, a first position first horizontal deflector, and a first position second horizontal deflector, to deflect the said first light ray bundle from the said first position to along said first optical axis, a second position first vertical deflector and a second position second vertical deflector to deflect the second light ray bundle from said second position to along said second optical axis, a dark bar dividing said film gate into a first area coinciding with the plane of the image of the object space carried by the first light ray bundle and a second area coinciding with the plane of the image of the object space carried by the second light ray bundle, said first area and said second areas being adjacent at the said film gate, said first optical axis passing through center of said first area and the optical center of said lens, and said second optical axis passing through the center of the said second area and the optical center of said lens, means located along said first and second light ray bundles, said means and said dark bar mask defining and separating the said first and second light ray bundles at the first and second areas of said film gate, said first light ray bundle being transmitted only to said first area, and said second light ray bundle being transmitted only to said second area, and in which at least one of said horizontal deflectors is rotable, the said second horizontal deflector having a transparent diagonal upper half plane and a specular reflecting lower half plane.

2. A 3-dimensional camera device according to claim 1, in which said second horizontal device is a glass cube having a laminated diagonal plane.

3. A 3-dimensional camera device according to claim 1, in which said second horizontal deflector is a first surface mirror.

4. A 3-dimensional camera device according to claim 1, in which said first horizontal deflector is a first surface mirror.

5. In a 3-dimensional camera device according to claim 1, said first horizontal deflector is a reflecting element having an angle $\eta$ of about 52°.

6. A 3-dimensional camera device according to claim 1, in which said means comprises a first set and a second set of mutually extinguishing filters, a first set between the said monocular lens and the said first and second positions, and a second set at the image plane at the gate.

7. A 3-dimensional camera device according to claim 6, in which said mutually extinguishing filters are polarizers.

8. A 3-dimensional camera device according to claim 7, and achromatic depolarizers between said object and said first set of polarizers.

9. A 3-dimensional camera device according to claim 7, and an achromatic half-wave birefringent plate between one of said first sets of polarizers and said object.

10. In a 3-dimensional camera device according to claim 1, means to control the convergence angle of the first and second light ray bundles from said object space.

11. In a 3-dimensional camera device according to claim 1, means to control the position of the said lens along its axis.

12. In a 3-dimensional camera device according to claim 1, means to control the convergence angle of the first and second light ray bundles from the said object space, and means to control the position of the said lens along its axis.

13. In a 3-dimensional camera device according to claim 1, a reflex camera having a viewfinder, a first dark bar between said first and second areas in the film gate, and a second dark bar between the first and second areas at the focal plane of the viewfinder.

14. A 3-dimensional camera device according to claim 13, in which said viewfinder is monocular, the images seen in the said viewfinder being identical with the images photographed on said film frame.

15. A 3-dimensional camera device according to claim 13, in which said viewfinder is binocular, a first set of mutually extinguishing filters at said image plane, a pair of oculars, a second set of mutually extinguishing filters on said oculars, prisms on said oculars, whereby said first and second images appearing at the image plane of said viewfinder are overlapped and appear in 3 dimensions when viewed through said binocular device.

16. A 3-dimensional camera device according to claim 13 in which horizontal and vertical reticle lines are placed at the image plane of said viewfinder to measure the convergence distance p by the displacement $\Delta_1$ of corresponding points of the right and left images on said image plane.

17. A 3-dimensional camera device according to claim 10, a reversible adjustable speed motor, a speed control device connected to said motor, a gear train driven by said motor, said gear train having first and second output shafts whose speeds are proportional and at a controlled ratio to each other, a first coupling device and a second coupling device attached to said first and second output shafts respectively whereby the angle $\alpha$ through which at least one of said horizontal deflectors is rotated, and the distance q of the optical center of the said lens to said film plane is varied in direct ratio to control the simultaneous convergence and focus while tracking an object being photographed as said object moves toward or away from the said camera.

18. A 3-dimensional camera device according to claim 1, means for adjusting at least one of said first and second vertical deflectors to control the vertical displacement and direction of the said second light ray bundle.

19. A 3-dimensional camera device according to claim 1, said camera being a reflex camera, an aperture in front of said device, first and second dark bars between said images in the film gate and at the focal plane of the viewfinder, adjusting means for at least one of said vertical deflectors, whereby the said images on said first and second areas are adjusted for vertical position, and vertical parallax.

20. A 3-dimensional camera device according to claim 1, in which the said second horizontal deflector is mounted upon a vertical shaft, a first means to control the angle through which said shaft is turned, and second means for adjusting the distance between the optical center of said lens and said film plane.

21. A 3-dimensional camera device according to claim 20, in which the said second horizontal deflector is rotable, and in which said first means rotates said deflector about a vertical axis through an angle $\alpha$ to adjust the convergence angle $\theta$ of the left and right images; and in which the said second means moves the lens along its axis varying the distance q between the optical center of said lens and said film plane, coupling between said first and second means providing a motion through a distance $\Delta q$ proportional to the change in angle $\Delta \alpha$ of rotation of the said second horizontal deflector.

22. A 3-dimensional camera device according to claim 21, a differential to control the relative angle between the first and second output means.

23. A 3-dimensional camera device according to claim 21, a means for decoupling the said coupling device, said first and second means comprising first and second shafts, respectively, and a means to independently control the angle of each of said shafts.

24. In a 3-dimensional camera device according to claim 1, a first lens and a second lens in front of said first and second positions respectively, a third lens in front of said monocular lens, means for adjusting the distance between the optical centers of the said first and second lenses whereby the interocular distance between said first and second positions is varied.

25. A 3-dimensional camera device according to claim 24, in which said first and second lenses are spherical plano concave, the index of refraction is about 1.685, the Abbe No. is at least 45, and the third lens is spherical convex, whereby the field of view is increased horizontally and vertically.

26. A 3-dimensional camera device according to claim 24, in which said first and second lenses are cylindrical plano-concave, the index of refraction is about 1.685, the Abbe No. is at least 45, and the third lens is cylindrical-convex, the axes of said cylinders being horizontal, whereby the angular field of view is increased vertically.

27. In a 3-dimensional camera device for photographing an object space in 3 dimensions from a first and a second position separated by an interocular distance, first and second light ray bundles from said object space to said first and second positions, a monocular lens, a first optical axis and a second optical axis through said lens, a film gate, a film frame at said film gate, a first position first horizontal deflector, and a first position second horizontal deflector, to deflect the said first light ray bundle from the said first position to along said first optical axis, a second position first vertical deflector and a second position second vertical deflector to deflect the second light ray bundle from said second position to along said second optical axis, a dark bar dividing said film gate into a first area coinciding with the plane of the image of the object space carried by the first light ray bundle and a second area coinciding with the plane of the image of the object space carried by the second light ray bundle, said first area and said second area being adjacent at the said film gate, said first optical axis passing through center of said first area and the optical center of said lens, and said second optical axis passing through the center of the said second area and the optical center of said lens, means located along said first and second light ray bundles, said means and said dark bar mask defining and separating the said first and second light ray bundles at the first and second areas of said film gate, said first light ray bundle being transmitted only to said first area, and said second light ray bundle being transmitted only to said second area, in which all the deflectors are prisms, and in which there are no reflective surfaces which reflect substantially.

28. A 3-dimensional camera device according to claim 27, in which said prisms are compound prisms.

* * * * *